United States Patent [19]

Graat

[11] 4,049,569

[45] Sept. 20, 1977

[54] PROCESS AND APPARATUS FOR PRODUCING AN INERT GAS

[75] Inventor: Johannes W. Graat, Overasselt, Netherlands

[73] Assignee: Smit Nijmegen B.V., Nymegen, Netherlands

[21] Appl. No.: 617,226

[22] Filed: Sept. 26, 1975

Related U.S. Application Data

[63] Continuation-in-part of Ser. No. 487,424, July 10, 1974, abandoned.

[30] Foreign Application Priority Data

May 17, 1974 Germany .............................. 2424064
Sept. 26, 1974 Germany .............................. 2445900

[51] Int. Cl.² ............................................. C01B 31/20
[52] U.S. Cl. ................................... 252/372; 110/119; 23/262; 23/281
[58] Field of Search ............................... 252/372, 373

[56] References Cited

U.S. PATENT DOCUMENTS

| | | | |
|---|---|---|---|
| 1,908,731 | 5/1933 | Clark | 423/242 |
| 2,233,841 | 3/1941 | Lepsue | 423/242 X |
| 2,296,434 | 9/1942 | Ghelardi et al. | 252/372 X |
| 2,582,938 | 1/1952 | Eastman et al. | 252/373 UX |
| 2,664,402 | 12/1953 | Cromeans | 252/373 |
| 2,714,552 | 8/1955 | Martin | 252/372 X |
| 2,809,104 | 10/1957 | Strasser et al. | 252/373 UX |
| 2,897,158 | 7/1959 | Sanzenbacher et al. | 252/372 |
| 3,232,727 | 2/1966 | Guptill et al. | 252/373 UX |
| 3,554,706 | 1/1971 | Henderson | 23/259.5 |

FOREIGN PATENT DOCUMENTS

| | | | |
|---|---|---|---|
| 2,246,742 | 5/1974 | Germany | 252/373 |
| 1,264,433 | 12/1968 | Germany | 252/373 |
| 1,049,876 | 7/1963 | United Kingdom | 252/372 |
| 473,697 | 3/1937 | United Kingdom | 252/372 |

OTHER PUBLICATIONS

Chemie-Ing Techn 40, 1968, pp. 1195-1196.

*Primary Examiner* — Howard T. Mars
*Attorney, Agent, or Firm* — Burgess, Dinklage & Sprung

[57] ABSTRACT

Process for the production of an inert gas wherein liquid or gaseous hydrocarbons are burnt within a combustion chamber with air, possible with the admixture of a gaseous atomizing agent, especially steam, gas inert gas or air, whereby a first shock-like cooling is performed, which is followed by a second cooling step and a scrubbing with water or an aqueous solution of a temperature in the vicinity of the freezing point, and the gas treatment is finished with an adsorption drying. The invention relates also to an apparatus for carrying out such process.

7 Claims, 6 Drawing Figures

PROCESS AND APPARATUS FOR PRODUCING AN INERT GAS

RELATED APPLICATIONS

This application is a continuation-in-part of copending application Ser. No. 487,424, filed July 10, 1974 and now abandoned.

BACKGROUND

The present invention relates to a method of producing inert gas, whereby liquid or gaseous hydrocarbons are burned in a combustion chamber with combustion air, possibly with the admixture of a gaseous atomizing agent (steam, gas, inert gas or air), and to an apparatus for carrying out such method.

Inert gas as produced in accordance with the present method is used predominantly in tank vessels and for transportation purposes for the neutralization of empty tanks and to provide an inert atmosphere within filled tanks. However, such inert gas may be employed also for fire extinction and as a protective gas in the transportation of perishable goods, such as e.g. fish meal, and in cold storage houses and the like.

It is known to produce inert gas by means of a burner in combustion chambers provided with ceramic linings, whereby the gas is thereafter cooled in spray coolers (cooling towers) wherein part of the water is already condensed while the gas is subjected to subsequent drying in a drying system. It is of disadvantage in these conventional methods that the apparatuses employed are rather expensive, that great expenditure of energy is required for the cooling, and that the control is sluggish such that quick shutoff is impossible in most cases and the combustion chamber may be damaged. Further, it has been found to be disadvantageous in the conventional method that maintaining of the desired composition of the inert gas is complicated and that the systems are susceptible to trouble and repair, while repairs can be performed with difficulty only, particularly as far as the combustion chamber is concerned. Besides, the inert gas produced in these systems must be dried by expensive means.

In contrast, it is the object of the present invention to provide a method and an apparatus for carrying out such method, which method and apparatus in general do no longer suffer from the above-mentioned disadvantages and from the disadvantages of the prior art.

In particular, the method according to the present invention can be controllable readily and with minimum sluggishness, while it requires minimum amounts of energy for the drying facilitate the production of an inert gas having the desired composition even in the case of fuel oils of high sulfur content, adapted to be carried out easily and economically and, in particular, allow to employ an apparatus which may be constructed economically and which may be of small size, too. Furthermore, the system can include a simple inert gas drying device adapted to be regenerated rapidly. In addition, the process of cooling the inert gas can be simplified and adapted to be performed also by means of conventional coolers as frequently present onboard ships. Mostly, these coolers are so-called Freon coolers wherein the water is cooled indirectly. Accordingly, the apparatus of the present invention can be of a correspondingly small size and of compact and trouble-proof construction, and this apparatus lends itself particularly for assembling a self-contained unit, such that economical production becomes possible.

According to another object of the invention, the present combustion chamber is adapted to be readily started up and shut off, and is protected against destruction even if trouble in the cooling water supply arises, and this combustion chamber should be adapted to be installed in any position.

SUMMARY

The present invention relates to an improvement in the production of an inert gas wherein liquid or gaseous hydrocarbons are burnt with air in a combustion chamber or zone, optionally in admixture with a gaseous atomizing agent such as steam, gas, inert gas or air, the hot combustion gases are first spray cooled and then further cooled and scrubbed with a aqueous medium, preferably at a temperature in the vicinity of the freezing point.

In the broadest aspect, the improvement of the invention involves carrying out the initial spray cooling immediately and directly after the hot combustion gases leave the combustion chamber or zone in a spray cooling chamber or zone which is contiguous to the combustion zone and essentially a cross-sectional continuation thereof, preferably with a plurality of spray sources (e.g. nozzles) spaced around the periphery of the spray cooling zone. Preferably the combustion zone is surrounded by a cooling jacket which is fed with cooling water which flows from there to the spray sources in the contiguous cooling zone.

In another embodiment, the combustion gases are further cooled after the first spray cooling by a second spray cooling, preferably using the same cooling water (i.e. from one source) which flows through the cooling jacket of the combustion zone and feeds the spray sources for the first spray cooling.

Preferably the second spray cooling is carried out in this fashion (using cooling water from a single source) in a contiguous or concentric enlarged spray cooling zone next to or surrounding the first spray cooling zone whereby the cooled gases flowing from such first cooling zone reverse direction and enter the concentric zone. For spray cooling in the concentric zone, the spray sources are preferably spaced around the outer periphery of the first spray cooling zone and are further adapted to direct the cooling spray generally opposite to the direction of flow of the combustion gases (thereby reducing the velocity of same).

In a further embodiment, the concentric cooling zone is followed by a second concentric zone through which the combustion gases flow, preferably via a constructed opening from the first concentric zone and wherein such gases are spray cooled and scrubbed with an aqueous medium at a temperature in the vicinity of the freezing temperature, preferably using the same arrangement of spray sources as in the preceding zone.

DESCRIPTION OF THE DRAWING

In the following, exemplary embodiments of the present invention are explained in greater detail by referring to the enclosed drawings, wherein.

DESCRIPTION

Practical test have shown that the inert gas generator according to the invention operates in a fully satisfactory manner. However, it has been found that the generator, for the production of relatively moist inert gas which is sufficient for many purposes, is too expensive or has an insufficient efficiency for these particular purposes.

More particularly, operation of the scrubber is relatively expensive for several reasons. These relative disadvantages are as follows:

A scrubber is economical in operation only if gas and water volumes are matched to each other in an optimum manner. When the throughflowing gas volume varies, the throughflowing water volume should be corrected in order to maintain the optimum value.

Every scrubber operates with a certain optimum flow rate depending on its volume and capacity. When the pressure of the gas flow exceeds an permissible value, the scrubbing water is retained in a layer extending transversely of the tower (exceeding of the flood or flow limit). If at all, the gas reaches the head of the scrubber in the form of large bubbles only. On the other hand, the scrubber operates uneconomical when an excess of water is employed.

The lowermost layer of the scrubber packing is contacted by extremely hot combustion gases such that it must consist of highly heat resistant packing elements. Fillings of this type (e.g. filling of stainless steel according to German Standard DIN 1.4404 or AISI 316 L) are very expensive.

The packing elements within the scrubber crush each other after a certain period of time, this resulting, as experience has shown, in a reduction of the gas pressure for the flood or flow limit.

In the case of large volumes of inert gas and a restricted height of structure (e.g. in vessels), a large scrubber diameter is required which results in relatively expensive constructions.

Accordingly, a further object of the invention is to provide an inert gas generator which can dispense with a scrubber subsequent to the combustion chamber while nevertheless producing inert gas having a dew point of, for instance, +30° C, such that this generator is acceptable for many purposes without more ado. For example moist inert gas of the type in question may be used in natural oil tanker vessels for the neutralization of the emptied tanks.

Of course, the field of use of the inert gas produced in accordance with the present method is not limited to this purpose. It is the expert's task to choose the inert gas in accordance with its requirements of use.

Hence, the improvement of the method resides in the fact that the scrubber is omitted. Therefore, according to the invention the requisite first and second cooling steps of the inert gas produced are performed as a spray cooling, whereby it is operated preferably with a cooling water flow supplied by the same source.

Further simplification of the inert gas generator required for performing the method is obtained by a mode of operation where in said first and second cooling steps are performed within the combustion chamber and within an enlargement of the combustion chamber. This makes better use of the space or volume occupied by the inert gas generator. Omission of the scrubber results in a substantially more compact system.

In order to allow to more easily desiccate the inert gas, the velocity of the gas is reduced within the second cooling chamber or combustion chamber enlargement to at least 25% of the velocity within the combustion chamber, by considering the change of volume by cooling. For carrying out the method, there may be used an inert gas generator being provided with a double-jacket or double-shell combustion chamber the jacket of which has a flow of cooling water therethrough and which has adjacent the gas outlet, spray nozzles for the exit of cooling water from the double jacket into the interior of the combustion chamber. In accordance with the present invention, the interior of the combustion chamber is joined with a second cooling zone having in the walls thereof spraying devices (spray nozzles, spray heads) which are adapted to be fed with cooling water passed through the double jacket. It has been found that the intense spraying of the inert gas allows to obtain an excellent scrubbing effect. In particular, $SO_2$ is removed almost completely.

However, in some cases it may be desirable to still further lower the dew point of the gas produced. To this end, it is proposed either to pass the gas produced again to a cooling space formed as a spray or shower cooler. On the other hand, it is also possible to conduct part of the cooling water, especially of the second cooling chamber, within a separate circuit, whereby this latter circuit includes a cooler which cools the cooling water to a very low temperature.

In particular, the invention proposes to this end a construction wherein the portion of the second cooling space through which the gas flows last, is provided with a collecting and discharging device by which the cooling water to be discharged separately, is separated from the remainder of the cooling water flow.

For carrying out the method of the invention, there are employed a burner provided within the present apparatus, and a controlling process as disclosed, for instance, in U.S. Pat. No. 3,870,456 and copending application Serial No. 381,894 now Pat. No. 3,947,217 which are incorporated herein by reference.

Figure 1:
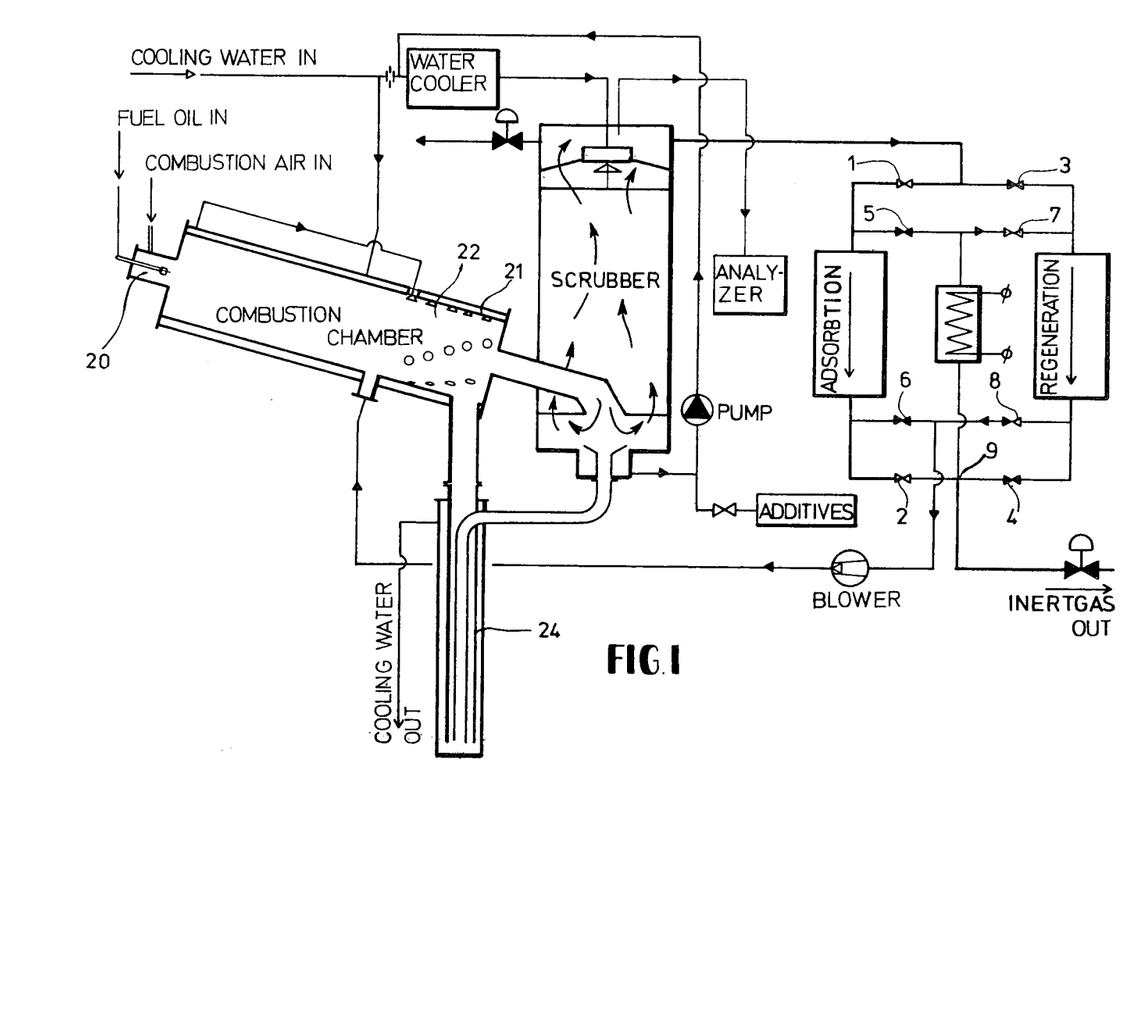
FIG. 1 shows a diagram of a preferred embodiment of an inert gas generator according to the invention.
Figure 2:
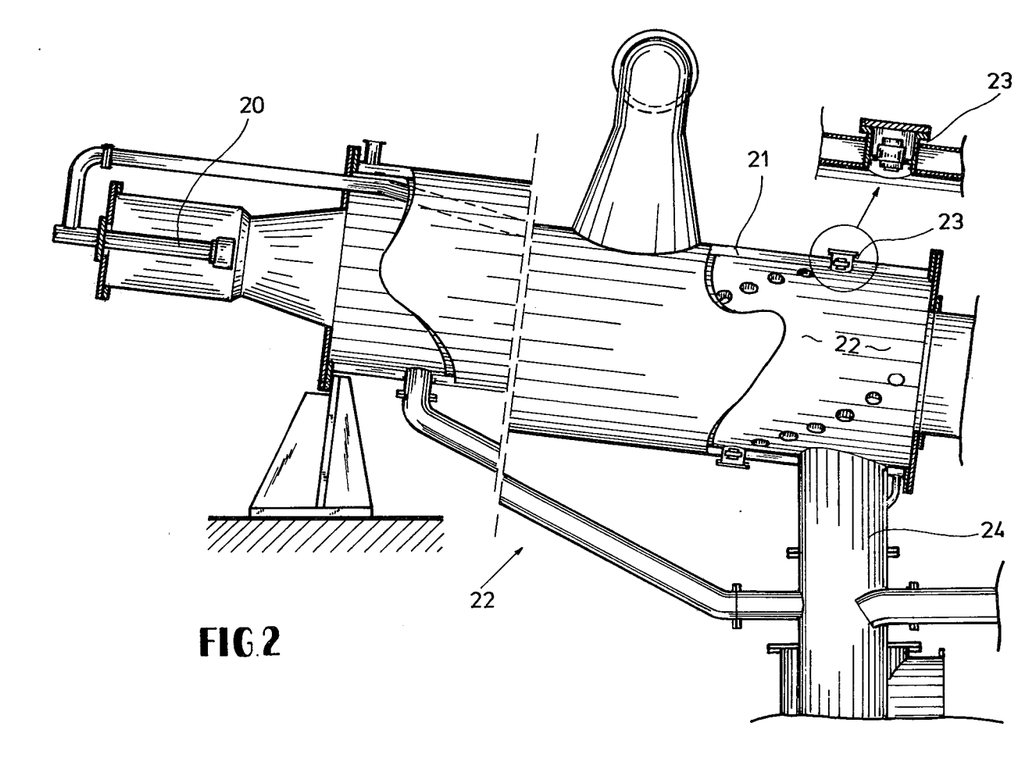
FIG. 2 illustrates a combustion chamber.

As shown in the left hand portion of FIG. 1 and in FIG. 2, oil, for example fuel oil, is burnt within a two-stage burner, whereby air, gas, inert gas or steam is used as an atomizing agent and whereby the combustion air — in a manner known per se — is fed in parallel through the burner 20. It is surprising to the expert that the method according to the invention, in addition to the combustion of gas, natural gas and fuel oil of low sulfur content, is also suitable for the combustion of fuel or diesel oil having a high sulfur content of up to 4%. The generated flame and the hot combustion gases enter into the actual combustion chamber 22 of cylindrical configuration and being provided with a cooling jacket 21, in which combustion chamber an inert gas having a very low content of nitric oxides is produced. Further, the inert gas produced contains an extremely low proportion of CO even in the case of minimum oxygen concentrations of e.g. 1000 ppm. Soot formation is completely eliminated.

Cooling water flows through the jacket of the combustion chamber, which cooling water is obtained e.g.

from the sea or from a different suitable cooling water reservoir.

The downstream or rear portion of the combustion chamber, as seen in the direction of the gas flow, carries spray nozzles 23 in the inner cylinder, through which nozzles the cooling water enters from the cooling jacket into the space of the combustion chamber thereby to cool the inert gas in a first stage immediately after the production thereof. It can be assumed that the inert gas is thereby adjusted to a temperature corresponding approximately to the temperature of the cooling water. Thus, when using cooling water of about 20° C, a gas temperature of about 20° C would be obtained. The cooling water is discharged in downward direction and removed through a conventional, gas-tight drain 24.

The inert gas flows both directly from the combustion chamber, and from the gas separator for the cooling water into a scrubber (scrubbing means and spray cooler) wherein it flows vertically upwards to be discharged at the head. The scrubber is packed, in a manner known per se, with Raschig rings of other suitable filling elements. The cooling water proper is supplied from above and distributed across the cross-sectional area of the scrubber through a suitable nozzle, so as to flow in countercurrent fashion to the gas. Upon collection of the cooling water in the sump of the scrubber, the cooling water is fed through a pump into a commercial cooler, e.g. a Freon cooler from which this water is returned to the scrubber (remark: Freon = $CF_2Cl_2$). Accordingly, the inert gas is cooled indirectly by supplying the cooling water into a cooler. Thereafter, the cooling water is directly contacted with the inert gas.

The cooler is constructed with very small dimensions even in the case of high performance. In addition to its function of cooling the cooling water, the cooler may perform also other cooling functions, such as the operation of an air conditioning system or the production of cooled drinking water.

Alternatively, a cooler utilized for other purposes may be used for cooling the circulating water.

Owing to the low water temperature within the scrubber, the solubility of the harmful gases is substantially increased. At the head of the scrubber, inert gas is withdrawn for analysis continuously or discontinuously, and the fuel/combustion air ratio within the combustion chamber is adjusted on the basis of such analysis.

As the water for the scrubber is pumped in circulation it is possible to operate with additives added by means of an additional metering device, e.g. a pump. The additives from compounds with the undesired components contained in the gas. If the water is passed in a circulation system, these additives are not removed again as in the case of continuously flowing cooling water. The temperature of the circulated cooling water is near the freezing point, for example at from about 1° to 4° C; the inert gas leaves the scrubber at approximately the same temperature as the circulated cooling water. An economizing effect to the system is obtained in this case in that the cooling water which has been heated to a slight degree only, is being re-used for the cooling process, and that in view of the low temperature level which is required for further cooling, an otherwise necessary cooling of through flowing cooling water can be avoided.

The combustion chamber (FIG. 2) has a cylindrical configuration and only a small diameter. Compared with the prior art, this combustion chamber is of substantially more compact construction. Apart herefrom, the configuration of the combustion chamber renders possible the production of inert gas at high pressure. The combustion chamber may be formed completely of steel or stainless steel, such that it can be rendered gas tight even at high pressures. In the case of using inert gas of relatively high pressure, the subsequent components, such as the above described scrubber and the subsequent drying system, are of very small volume, too, such that, on the whole, a very compact system is obtained at low cost.

The inert gas flows from the scrubber to a pair of drying adsorbers which, as known per se, are packed with an adsorbing, hydrophilic material, e.g. silicagel or aluminagel or a different suitable material, such that the dew point may be adjusted from, for example, plus 30° C to from minus 20° C to minus 70° C. Depending on the requisite dew point — which forms a measure of the existing water contents —, the respective suitable drying agent is employed. In this case, the dew point of the mixture is so low that raising of the gas temperature results in a drying which is substantially complete for the aspired purpose.

In operation, each of the absorbers is operative alternatingly, while the other adsorber is being regenerated continuously or discontinuously during the period of operation of the respective other adsorber. As shown in FIG. 1, the inert gas first flows across the open valves 1 through the adsorber shown in the left hand position in the Figure, and then through valve 2 to the utilizing connection. A partial flow of the dried or desiccated gas is withdrawn at 9 and heated in a heater. Then, the gas flows over the open valve 7 through the second adsorber which is at that time connected for regeneration, and over a second open valve 8 back into the combustion chamber with slight pressurization by a blower. Advantageously, the connecting line opens into a portion of the combustion chamber where the combustion is already terminated and after which the first scrubbing step takes place.

The blower may have a very small power rate only as it is only necessary to compensate for the flow losses of the inert gas within the scrubber and within the adsorbers which are connected in series for the partial flow.

After the removal of the water by the heated inert gas, the heater is deenergized and cool inert gas is passed through the adsorber to be regenerated. Hereby, the adsorber composition is cooled to operation temperature again.

After the first adsorber is loaded and the second adsorber is regenerated, the valves are reversed. Valves 1 and 2 as well as valves 7 and 8 are closed, and valves 3 and 4 as well as valves 5 and 6 are opened. Thereupon, the inert gas stream flows over valve 3 into the right hand adsorber as shown in FIG. 1 and then over valve 4 to the utilizing point. Again, a partial flow is withdrawn at point 9 and heated in the heater. This partial flow then flows over the now open valve 5 through the left hand adsorber (FIG. 1) from which this partial flow is again conducted to the blower through valve 6.

As the regeneration is effected by previously dried or desiccated inert gas, this regeneration can be performed in a shorter period of time than in the conventional adsorbers which are desiccated by means of heated atmospheric air. The latter would still contain a very high amount of water, especially in tropical areas. With suitable selection of the branched (partial) gas flow and with an increase in temperature, switch-over from one adsorber to the other can be effected in shorter intervals, such that the size of these adsorbers can be greatly decreased, too. Also the, regeneration with inert gas is more economical than the regeneration by means of atmospheric air because the latter must be heated to a very high temperature first which results in higher stress of the material. Furthermore, as the inert gas used for regeneration may be fed back, gas losses can be avoided.

In the second stage, the cooling of the inert gas produced approaches temperatures in the vicinity of the freezing point; accordingly, the removal of SO$_2$ is obtained to a very substantial degree already at this point.

Experience has shown that the apparatus described above can be operated at lower temperatures than the conventional inert gas generators. Besides, it is possible to use a higher gas pressure. Hence, the present method is superior to the conventional methods. In addition, the present method allows to use fuel oils of high sulfur content. The scrubbing efficiency of the scrubber may be greatly improved by the addition of additives which greatly increase the adsorbing capacity of the scrubbing water. For example, diluted lyes or liquors are added which convert the SO$_2$ of the generated gas into soluble compounds.

Figure 3:
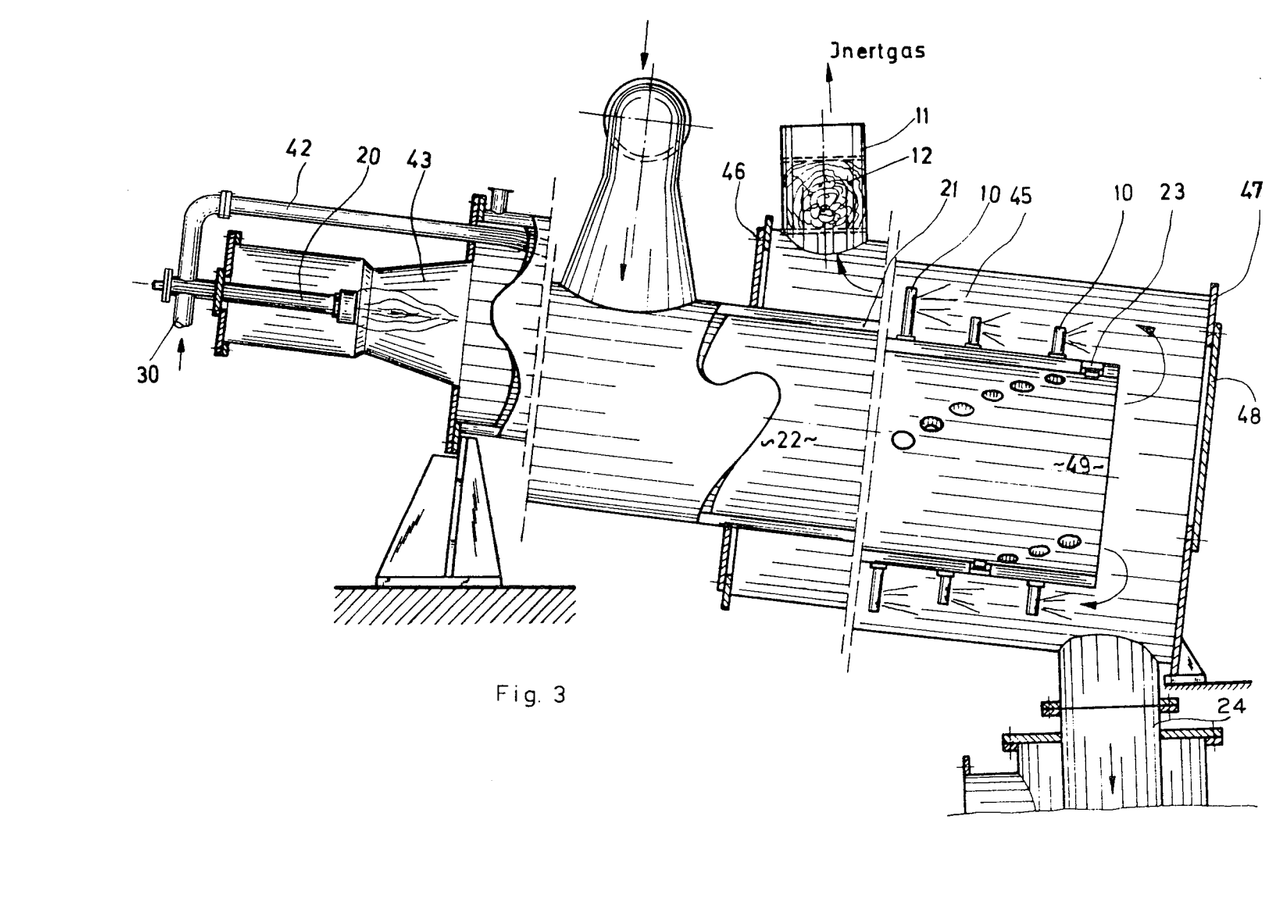
FIG. 3 shows an inert gas generator according to another embodiment of the invention.

FIG. 3 shows another embodiment of the present inert gas generator wherein at the left hand side of the illustration a double-stage or two-stage burner 20 is disposed within a closed cylindrical housing, which burner serves to burn hydrocarbons, especially fuel oil. An atomizing medium (air, gas, inert gas or steam) is supplied through a pipe 42. In order to pre heat this atomizing air, pipe 42 is passed through the combustion chamber. Combustion air is supplied to the burner 20 in parallel via a conduit or pipe 30. The generated flame and the hot combustion gases enter into the interior space 22 of the combustion chamber proper through an enlargement 43. The interior space of the combustion chamber is cylindrical in configuration and surrounded by a double jacket or shell 21.

The double jacket 21 at the same time serves as the cooled wall of the interior space and as supply means for the cooling water to be sprayed by spraying elements. Particularly in the case of ships, the cooling water is derived from the sea or from another suitable cooling water reservoir.

Figure 4:
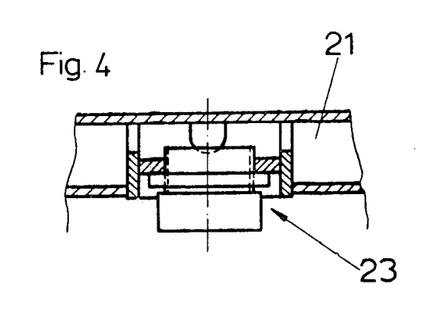
FIG. 4 shows a spray nozzle directed into the interior space of the combustion chamber.

The portion of the double jacket 21 at the rear in the direction of the gas flow is provided at the inner sinde thereof with spray nozzles 23 which are shown in detail in FIG. 4.

The water enters the interior space 22 is a finely divided form through the spray nozzles 23, thereby to produce a first shock-like cooling of the hot combustion gases.

Whereas it is proposed in the first embodiment that the cooled inert gas is then passed to a scrubber, another mode of operation is employed in the embodiment according to FIG. 3. As can be seen from FIG. 3, a second cooling space 45 is installed around the double jacket and the opening (mouth) of the combustion chamber proper, whereby the walls of the cooling space 45 form a cylinder disposed in concentric relation to the double jacket 21, which cylinder encloses at least the rear portion of the combustion chamber proper. Combustion chamber and second cooling space are inclined relative to the horizontal such that a lowest point of the cooling space results. A gas tight water discharge 24 is provided in the region of such lowest point. Front and rear walls of the second cooling space 45 are closed by end walls 46,47. The end wall 47 is provided with a so-called manhole 48 through which the interiors of the second cooling space and of the interior space 22 of the combustion chamber are accessible.

As indicated in FIG. 3, the cooled combustion gases flow from the opening 49 of the interior space 22 into the second cooling space where their flow direction is reserved such that they flow across a second spray nozzle system including spray heads 10. The spray heads are shown in detail in FIG. 5.

Figure 5:
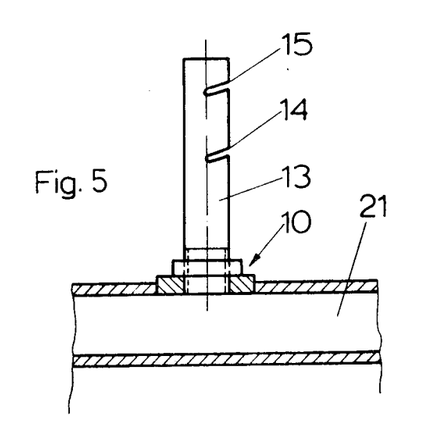
FIG. 5 shows a spray head directed into the interior space of the second cooling chamber.

When the inert gas flows along the spray heads 10, it is passed through a flow of sprayed water a second time, whereby the inert gas is further cooled. While passing through the sprayed water, the gas is also scrubbed and, in particular, substantially cleaned from the entrained SO$_2$. In the region of the spray heads 10, the velocity of the inert gas is substantially reduced as compared with the velocity within the combustion chamber itself, such that the gas entrains a small quantity of cooling water only. The precipitating cooling water reaches the lowest point of the cooling space 45 and flows, as mentioned above, into the discharge means 24. The substantially dried inert gas (dew point in the vicinity of the cooling water temperature, i.e. at about 30° C) flows through a drain 11 including a droplot separator 12 to a consumer station or into another drying circuit as described in detail in connection with FIG. 1.

As shown in FIGS. 3 and 5, the spray heads 10 are fed with the cooling water flowing within the double jacket 21. Accordingly, no second water circuit is required such that the complextity of the present inert gas generator is further reduced. The spray heads 10 comprise an elongate cylindrical tube 13 screwed into the double jacket, which tube is provided with sharp edged slots 14, 15 extending transversely of the tube axis. The slots are directed opposite to the flow direction of the approaching inert gases. The tubes have different heights such that an optimum uniform and complete coverage of the space by the cooling water within the second cooling space is ensured.

It may be assumed that the inert gas at the end of the interior space of the combustion chamber (opening 49) has a temperature of about 20° C above the temperature of the cooling water. Upon flowing through the second cooling space, the inert gas is again cooled by the finely divided (atomized) cooling water to a temperature corresponding approximately to the cooling water temperature. With the complete penetration of the inert gas flow, it is also obtained that the gas is rendered substantially free from sulfur dioxide. Furthermore, the rapid and complete discharge of the sprayed and loaded scrubbing water ensures that corrosion in the region of the spray nozzles and of the second cooling space can be avoided almost entirely. This aspect is of particular importance especially for the use of sea water as the cooling water. Hereby, a discharge of water can be obtained both in the inclined arrangement according to FIG. 3 and in a vertical arrangement of the generator which may be necessary in various installations. As the spraying system is operable already at water pressures of from 0.3 to 0.5 kg/cm$^2$ (atmospheres), whereby the pressure must exceed that of the inert gas, this pressure can be produced in any desired system by means of simple pumps.

Figure 6:
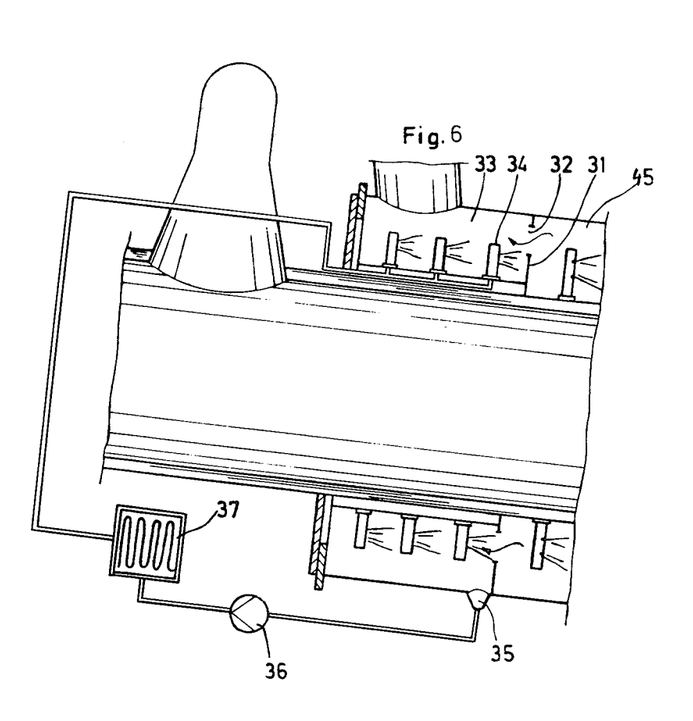
FIG. 6 illustrates a further embodiment of the spray cooler.

FIG. 6 illustrates a further embodiment of the spray cooler. In this case, the second cooling space 45 includes a division provided by a partially open wall 31.

The greatly cooled and purified gas flows through an opening 32 into the separate cooling space or chamber 33 which is likewise equipped with spray heads 34. However, the cooling water sprayed by the spray heads 34 does not flow into the discharge 24, but rather into a separate discharge 35 and from this discharge into a pump 36 and a cooler 37 wherein the cooling water is cooled to a temperature of about 0° C. Then, the additionally refrigerated cooling water flows back to the spray heads 34. The low-temperature cooling water renders possible a further reduction of the dew point of the inert gas. Thus, the chosen construction in ready manner offers a possibility of improvement which provides for a further improvement of the quality of the inert gas produced.

What is claimed is:

1. In a process for the production of an inert gas wherein liquid or gaseous hydrocarbons are burnt with air and the hot combustion gases are subsequently spray cooled, the improvement which comprises:
   a. carrying out said burning in an elongated combustion zone surrounded by a cooling jacket;
   b. spray cooling the hot combustion gases immediately after combustion in a spray cooling zone contiguous to the combustion zone which spray cooling zone is a cross-sectional continuation of the combustion zone, said spray cooling being carried out with a plurality of spray nozzles spaced around the periphery of said spray cooling zone;
   c. feeding said cooling jacket with cooling water which flows therethrough to said spray cooling step; and
   d. cooling and scrubbing the gases from the spray cooling zone with an aqueous medium at a temperature in the vicinity of the freezing point.

2. Process of claim 1 wherein said aqueous medium is recooled and recycled to the cooling and scrubbing step.

3. Process of claim 1 wherein the inert gas produced is treated by adsorption drying.

4. Process of claim 3 wherein a partial stream of said inert gas is branched off after the adsorption drying, heated, passed through an adsorption dryer to regenerate same and then fed to the combustion chamber.

5. In a process for the production of an inert gas wherein liquid or gaseous hydrocarbons are burnt with air in a cylindrical combustion zone and the hot combustion gases are subsequently spray cooled, the improvement which comprises carrying out said spray cooling in two steps, the first step being carried out in a first spray cooling zone immediately following combustion, said first spray cooling zone being contiguous to and a cylindrical continuation of said combustion zone, said first spray cooling being carried out with a plurality of spray nozzles spaced around the periphery of said first spray cooling zone, said second spray cooling being carried out in an enlarged second spray cooling zone concentric with the first spray cooling zone, the gases flowing from the first spray cooling zone reversing direction and entering the enlarged concentric second spray cooling zone, said second spray cooling step being carried out with a plurality of spray cooling sources spaced around the outer periphery of the first spray cooling zone.

6. Process of claim 5 wherein the spray sources for the second spray cooling direct the cooling spray generally opposite to the direction of flow of the combustion gases thereby reducing the velocity of the gases, e.g. lowering same to at least 25% of the velocity of the gases in the combustion chamber.

7. Process of claim 5 wherein the concentric zone is followed by a second concentric zone through which the combustion gases flow while being spray cooled and scrubbed with an aqueous medium at a temperature in the vicinity of the freezing point.

* * * * *